US012395384B1

(12) United States Patent
Zhang

(10) Patent No.: US 12,395,384 B1
(45) Date of Patent: Aug. 19, 2025

(54) ADAPTIVE EQUALIZER PERFORMANCE MONITOR

(71) Applicant: ACACIA TECHNOLOGY, INC., San Jose, CA (US)

(72) Inventor: Hongbin Zhang, Maynard, MA (US)

( * ) Notice: Subject to any disclaimer, the term of this patent is extended or adjusted under 35 U.S.C. 154(b) by 0 days.

(21) Appl. No.: 17/587,916

(22) Filed: Jan. 28, 2022

(51) Int. Cl.
*H04L 25/03* (2006.01)

(52) U.S. Cl.
CPC .......... *H04L 25/03057* (2013.01); *H04L 2025/03611* (2013.01); *H04L 2025/03687* (2013.01)

(58) Field of Classification Search
CPC ......... H04L 25/03006; H04L 25/03019; H04L 25/03057; H04L 25/03108; H04L 25/03834; H04L 25/03885; H04L 2025/03611; H04L 2025/03636; H04L 2025/03687
USPC ............... 375/229, 232, 236, 346, 348, 350; 708/322, 323
See application file for complete search history.

(56) References Cited

U.S. PATENT DOCUMENTS

| | | | | |
|---|---|---|---|---|
| 6,573,947 B1* | 6/2003 | Oh | ....................... | H04N 21/426 348/614 |
| 11,387,929 B1* | 7/2022 | Zhang | .................. | H04B 10/614 |
| 2007/0286318 A1* | 12/2007 | Imahashi | .......... | H04L 25/03343 375/355 |
| 2011/0103454 A1* | 5/2011 | Bose | ................. | H04L 25/03165 375/232 |
| 2012/0185523 A1* | 7/2012 | Hauske | ................... | H04L 7/027 708/300 |
| 2012/0302188 A1* | 11/2012 | Sahota | .................. | H04B 1/525 455/150.1 |
| 2014/0212132 A1* | 7/2014 | Saito | ....................... | H04L 25/03 398/152 |
| 2014/0269937 A1* | 9/2014 | Wadsworth | ........... | H04L 1/0003 375/240.26 |
| 2020/0119814 A1* | 4/2020 | Binkai | ................. | H04B 10/615 |
| 2022/0173941 A1* | 6/2022 | Sun | ......................... | H04L 25/03 |
| 2022/0255631 A1* | 8/2022 | Li | ........................... | H04J 14/06 |
| 2022/0303012 A1* | 9/2022 | Takamuku | ............... | H04B 3/04 |
| 2023/0170994 A1* | 6/2023 | Takamuku | ............. | H03H 21/00 398/147 |

FOREIGN PATENT DOCUMENTS

| | | | | |
|---|---|---|---|---|
| CN | 111052641 A | * | 4/2020 | .......... H04B 10/077 |
| CN | 113271271 A | * | 8/2021 | ....... H04L 25/03006 |
| WO | WO-2021241362 A1 | * | 12/2021 | ......... H04B 10/2569 |

* cited by examiner

*Primary Examiner* — Young T. Tse

(74) *Attorney, Agent, or Firm* — Patterson + Sheridan, LLP

(57) ABSTRACT

In part, the disclosure relates to a method of equalizer performance monitoring. The method includes receiving a signal at a receiver; adjusting step size of an adaptive equalizer in response to changes in state of polarization (SOP) of the received signal, wherein adaptive equalizer is in communication with one or more digital signal processing DSP components, wherein the one or more DSP components are in communication with the receiver; and increasing or decreasing step size of adaptive equalizer in response to updates to one or more filter coefficients.

15 Claims, 7 Drawing Sheets

ADAPTIVE EQUALIZER PERFORMANCE MONITOR

FIELD

This disclosure relates generally to the field of telecommunications and digital signal processing.

BACKGROUND

Contemporary optical communications and other photonic systems make extensive use of various digital signal processing methods for various purposes.

SUMMARY

In part, the disclosure relates to a method of equalizer performance monitoring. The method includes receiving a signal at a receiver; adjusting step size of an adaptive equalizer in response to changes in state of polarization (SOP) of the received signal, wherein adaptive equalizer is in communication with one or more digital signal processing DSP components, wherein the one or more DSP components are in communication with the receiver; and increasing or decreasing step size of adaptive equalizer in response to updates to one or more filter coefficients.

In one embodiment, the method further includes adaptively updating one or more filter coefficients using a constant modulus algorithm (CMA) or a radius directed equalizer (RDE) algorithm. In one embodiment, the step size determines tracking speed of adaptive equalizer. In one embodiment, the method further includes selecting one or more filter updates having a minimum mean-square error. In one embodiment, the output of the equalizer is a Stokes vector, wherein the step size of equalizer is adjusted such that the Stokes vector lies in the $S_2$-$S_3$ plane.

In one embodiment, the method further includes synchronizing pilot symbols at equalizer output, wherein the pilot symbols are represented by $$\begin{bmatrix} E_x \\ E_y \end{bmatrix}.$$

In one embodiment, the method further includes selecting a first trial matrix M(1) and a second trial matrix M(2) and applying M(1) and M(2) to equalizer output. In one embodiment, M(1) and M(2) are each a trial Jones matrix, wherein M(1) and M(2) each comprise a parameter $\alpha = \pm \alpha_0$. In one embodiment, the method further includes iteratively applying M(1) and M(2) to equalizer output until output is in $S_2$-$S_3$ plane. In one embodiment, the method further includes applying M(1) and M(2) to pilot symbols as follows $$\begin{bmatrix} E_x(1) \\ E_y(1) \end{bmatrix} = M(1) \begin{bmatrix} E_x \\ E_y \end{bmatrix}$$

and $$\begin{bmatrix} E_x(2) \\ E_y(2) \end{bmatrix} = M(2) \begin{bmatrix} E_x \\ E_y \end{bmatrix}.$$

In one embodiment, the method further includes calculating absolute value of power difference D(i) between x and y polarization components after the application of M(1) and M(2), wherein i is an index, wherein $$D(0) = ||E_x|^2 - |E|^2|$$

$$D(1) = ||E_x(1)|^2 - |E_y(1)|^2|$$

$$D(2) = ||E_x(2)|^2 - |E_y(2)|^2|$$

In one embodiment, the method further includes incrementing a counter if D(0)<D(1) and D(0)<D(2), otherwise decrement a counter. In one embodiment, wherein when the counter value is greater than an upper threshold decrease the equalizer step size by half and reset counter.

In one embodiment, $$M(1) = \begin{bmatrix} 1 & -0.125 \\ 0.125 & 1 \end{bmatrix}$$

and $$M(2) = \begin{bmatrix} 1 & 0.125 \\ -0.125 & 1 \end{bmatrix}.$$

In one embodiment, $$M(1) = \begin{bmatrix} 1 & -0.25 \\ 0.25 & 1 \end{bmatrix}$$

and $$M(2) = \begin{bmatrix} 1 & 0.25 \\ -0.25 & 1 \end{bmatrix}.$$

In one embodiment, multiplication of one or more entries of M(1) and M(2), when applied to equalizer output is performed by shifting one or more bits of $E_x$ and $E_y$.

In part, the disclosure relates to a method of monitoring residual inter symbol interference. The method includes receiving a signal at a receiver from a transmitter, wherein the signal is a linearly modulated digital signal, wherein an adaptive equalizer is in communication with the receiver; generating an equalizer output from the adaptive equalizer; determining a spectral correlation of the equalizer output; and monitoring changes to the spectral correlation over time. In one embodiment, monitoring changes to the spectral correlation is independent of SNR and modulation format of the received signal. In one embodiment, filter coefficients for the adaptive equalizer are updated when spectral correlation is greater than about 0.25.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
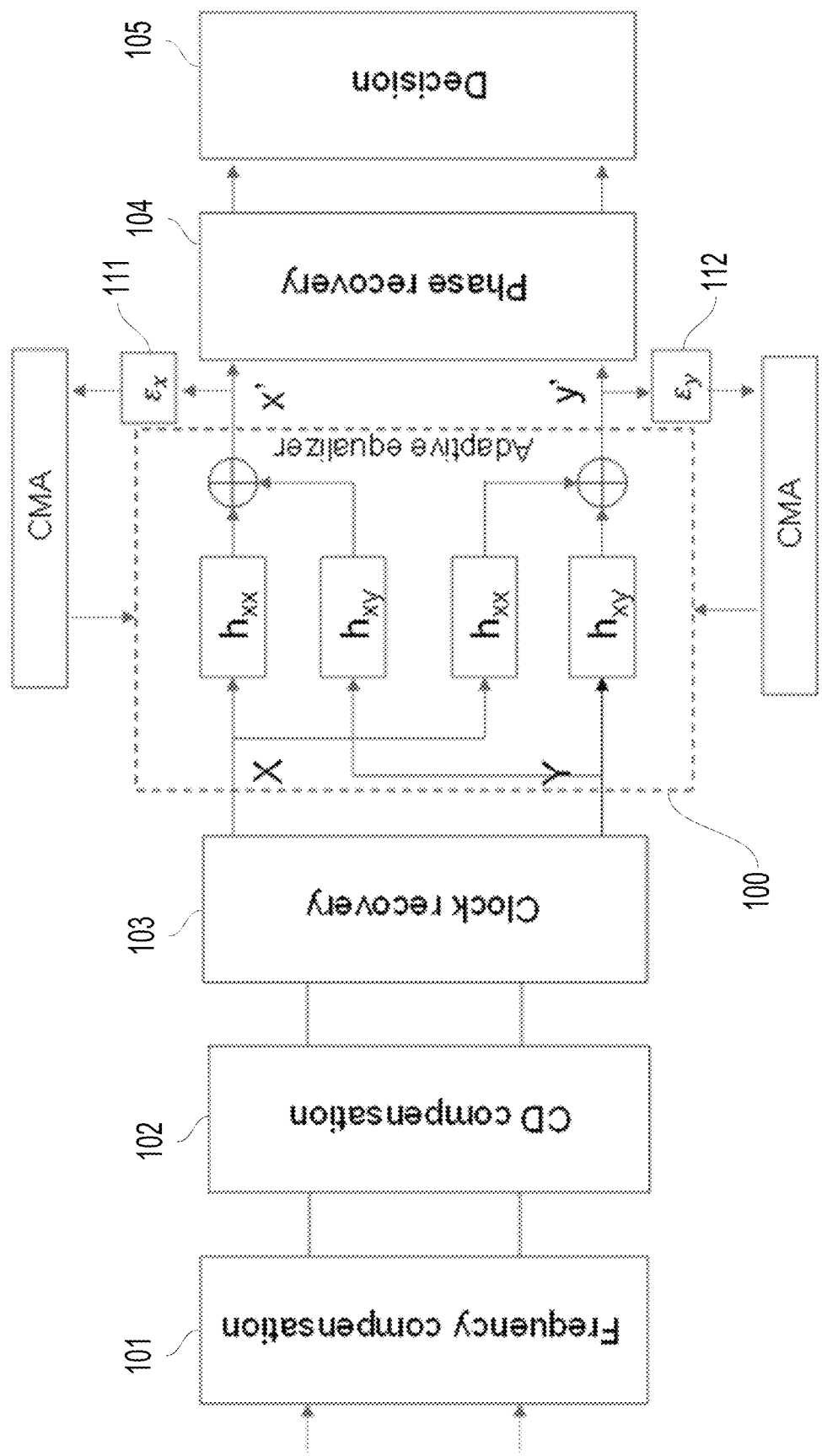
FIG. 1 is a diagram of blocks in a digital signal processor (DSP) before forward error correction (FEC) according to an exemplary embodiment of the disclosure.

Optical networks employ digital, coherent, optical receivers widely, enabling high spectral efficiency transmission. Such receivers can compensate for linear transmission impairments by using adaptive equalization. In part, the disclosure relates to electro-optical devices such as receivers that include a DSP configured to include an equalizer performance monitor ("EPM"). In some embodiments, the EPM operates in real time and supports real time signal processing by the DSP. In some embodiments, the EPM operates in real time by using a Stokes space monitor to adaptively adjust the equalizer's step size. In addition, in various embodiments, the EPM also includes a spectral correlator monitor to reduce equalizer error. In many embodiments, an equalizer of a DSP, such as DSP in electrical communication with a receiver, may have a step size. Applicant has realized that equalizer performance is optimized or improved when the step size is adjusted based on changes in the state of polarization (SOP) of the received signal. For fast changes in SOP, step size is increased. The step size is decreased to improve the accuracy of filter coefficients in a steady state. In this way, in some embodiments, the equalizer is adaptive in response to SOP changes. A fast and accurate performance monitor judges if the adaptive equalizer can track the fast change of SOP. In some embodiment, average power is used as a control variable to adjust adaptive filter/adaptive equalizer and/or its step size. Applicant has also realized that it is useful to monitor the output of the adaptive equalizer output independent of the signal-to-noise ratio (SNR). Both an equalizer's error vector magnitude (EVM) and the SNR of an output of an equalizer are affected by system SNR and so do not exclusively measure the equalizer performance. In part, in some embodiments, the disclosure relates to systems and methods of equalizer performance monitoring that adaptively adjusts the step size and that is independent of SNR. Refer now to the exemplary embodiment of FIG. 1, wherein DSP blocks, such as frequency compensation 101, chromatic dispersion (CD) compensation 102, clock recovery 103, phase recovery 104, and symbol decision 105, before an FEC decoder are illustrated. In various embodiments, one or more of these blocks is in electrical or optical communication with a receiver, such as a coherent receiver, a digital coherent receiver, a symbol rate receiver and others. In various embodiments, in a receiver, free-running analog-to-digital converters (ADCs) sample a received waveform at a rate higher than the symbol rate to avoid aliasing effects. After laser frequency compensation and chromatic dispersion compensation, received data may be resampled into T/2-spaced samples after synchronizing the clock frequency from a transmitter. An adaptive filter (or adaptive equalizer) 100 is used to demultiplex polarization tributaries from the polarization multiplexed signal and polarization mode dispersion (PMD) compensation. Error signals $\varepsilon_x$ 111 and $\varepsilon_y$ 112 are generated from equalizer 100 based on the signal power of the output. Filter coefficients are adaptively updated by using a constant modulus algorithm (CMA) or a radius directed equalizer (RDE) algorithm. The step size of filter updates determines the tracking speed of adaptive equalizer and steady state accuracy. In many embodiments, the output of an equalizer is a Jones vector, a 2×1 vector of x and y components of a received electric field, $$\begin{bmatrix} E_x \\ E_y \end{bmatrix}.$$

Figure 2:
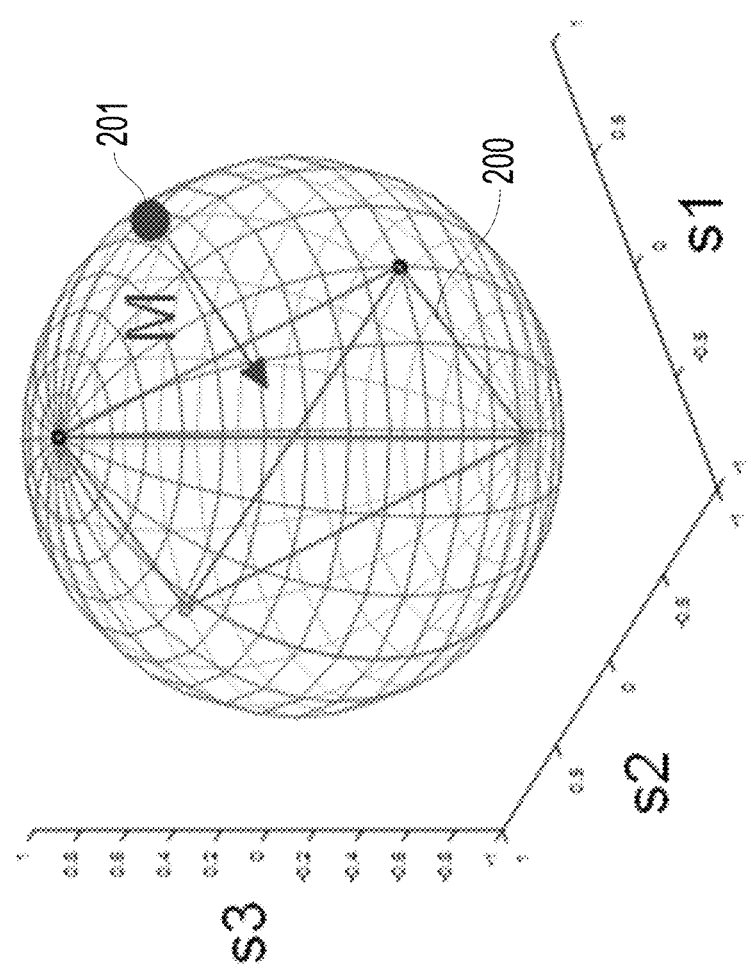
FIG. 2 is an illustration of Stokes space and application of a Jones (rotation) matrix M on an equalizer output according to an exemplary embodiment of the disclosure.

Refer now to the exemplary embodiment of FIG. 2. The Jones vector is related to a Stokes vector $$\begin{bmatrix} S_1 \\ S_2 \\ S_3 \end{bmatrix} = \begin{bmatrix} \frac{1}{2}(|E_x|^2 - |E_y|^2) \\ \text{real}(E_x E_y^*) \\ \text{imag}(E_x E_y^*) \end{bmatrix}$$

with Stokes parameters $S_1$, $S_2$, and $S_3$. The Stokes parameters form the Poincaré sphere, illustrated in FIG. 2.

In many embodiments, for a polarization multiplexed quadrature phase-shift keying (QPSK) modulated signal, there is equal power in both x and y polarization components when the equalizer has converged, i.e. $|E_x|^2=|E_y|^2$ and therefore $S_1=0$. In this case, the equalizer output (the Stokes vector) lies in the $S_2$-$S_3$ plane. If, on the other hand, the equalizer is unable to track fast changes in SOP, then $S_1 \neq 0$ and the Stokes vector output is not in the $S_2$-$S_3$ plane.

In many embodiments, the equalizer performance monitor is configured to adjust the equalizer output such that the output value lies within the $S_2$-$S_3$ plane 200. Adjusting the equalizer such as the output values lie in the plane is desirable because it indicates that the equalizer is converged such that X and Y polarization tributaries are separated. This may be achieved by application 201 of a Jones matrix M to the Jones vector output of the equalizer, $$M\begin{bmatrix} E_x \\ E_y \end{bmatrix} = \begin{bmatrix} E'_x \\ E'_y \end{bmatrix},$$

where $$M = \begin{bmatrix} \cos(\alpha) & \sin(\alpha) \\ -\sin(\alpha) & \cos(\alpha) \end{bmatrix}$$

and $$\alpha = 0.5 \operatorname{atan}\left(\frac{\sqrt{V_3^2 + V_2^2}}{V_1}\right).$$

Furthermore, $$V = \begin{bmatrix} V_1 \\ V_2 \\ V_3 \end{bmatrix}$$

is the eigenvector of a matrix A based on an ensemble of N Stokes vectors $$\begin{bmatrix} S_1(k) \\ S_2(k) \\ S_3(k) \end{bmatrix}, k = 1, 2, \ldots, N$$

corresponding to different equalizer outputs. The matrix A is given by $$A = \begin{bmatrix} \sum S_1^2(k) & \sum S_1(k)S_2(k) & \sum S_1(k)S_3(k) \\ \sum S_1(k)S_2(k) & \sum S_2^2(k) & \sum S_2(k)S_3(k) \\ \sum S_1(k)S_3(k) & \sum S_2(k)S_3(k) & \sum S_3^2(k) \end{bmatrix}.$$

In many embodiments, calculation of the matrix A and its eigenvector and therefore the Jones matrix M is complicated and not easily implemented in real-time DSP processing. However, in some embodiments, because the matrix M has a single parameter $\alpha$, it need not rely on phase retarders to introduce a phase difference between two polarization components in the Jones vector.

In many embodiments, Applicant has realized that an adaptive equalizer performance monitor need only determine if the adaptive equalizer output lies in the $S_2$-$S_3$ plane. Therefore, precise calculation of the Jones matrix M is not necessary. Instead, two trial Jones matrices M(1) and M(2) with fixed parameter $\alpha = \pm \alpha_0$ may be constructed, applying both to the equalizer output, and then checking whether the output lies in the $S_2$-$S_3$ plane. After a certain number of applications of either matrix, such as between 1 and about 100 applications of either matrix, an equalizer step size may be adjusted. An exemplary embodiment of this process is provided below:

1. Synchronize pilot symbols $$\begin{bmatrix} E_x \\ E_y \end{bmatrix},$$

which are usually QPSK signals, at equalizer output.

2. Apply both trial Jones matrices M(1) and M(2) to get new Stokes parameters, $$\begin{bmatrix} E_x(1) \\ E_y(1) \end{bmatrix} = M(1) \begin{bmatrix} E_x \\ E_y \end{bmatrix}$$

and $$\begin{bmatrix} E_x(2) \\ E_y(2) \end{bmatrix} = M(2) \begin{bmatrix} E_x \\ E_y \end{bmatrix}.$$

3. Calculate the absolute value of power difference between x and y polarization components after the application of M(1) and M(2), $$D(0) = ||E_x|^2 - |E_y|^2|$$

$$D(1) = ||E_x(1)|^2 - |E_y(1)|^2|$$

$$D(2) = ||E_x(2)|^2 - |E_y(2)|^2|$$

4. If D(0)<D(1) and D(0)<D(2), then increment a counter, otherwise decrement a counter.
5. When the counter value is greater than an upper threshold or first threshold (for example the upper or first threshold may range from about 90 to about 150), then decrease the equalizer step size by half and reset the counter value to a low value or reset value (for example, in some embodiment this low value or reset values ranges from about 1 to about 50).
6. When the counter value is less than a low threshold or second threshold (for example, this low or second threshold may range from about 5 to about 20), then the equalizer cannot track the received signal. In response to such a low counter value, in some embodiments, the step size may be doubled and the counter value rest to a high value (e.g. such as ranging from about 80 to about 200). In some embodiments, the reset values are between low and upper threshold to give sufficient recovery time.

In most embodiments, trial Jones matrices M(1) and M(2) are chosen with fixed parameter $\alpha = \pm \alpha_0$ to avoid trigonometric calculations or multiplication or division. In various embodiments, adjusting $\alpha = \pm \alpha_0$ instead of using sin, cosine, or other high latency calculations supports or real-time operation of DSP and performance monitoring. In some embodiments, a choice of $\alpha_0$ may be $\alpha_0 = a \sin(0.125) = 7.1808°$, so that $$M(1) = \begin{bmatrix} 1 & -0.125 \\ 0.125 & 1 \end{bmatrix}$$

and $$M(2) = \begin{bmatrix} 1 & 0.125 \\ -0.125 & 1 \end{bmatrix}.$$

In other embodiments, a choice of do may be $\alpha_0$=a sin $(0.25)$=14.4775°, so that $$M(1) = \begin{bmatrix} 1 & -0.25 \\ 0.25 & 1 \end{bmatrix}$$

and $$M(2) = \begin{bmatrix} 1 & 0.25 \\ -0.25 & 1 \end{bmatrix}.$$

Multiplication by 0.125 and 0.25 is implemented by a right shift of 3 or 2 bits. Note that the approximation cos $(\alpha_0)\approx 1$ is used in the above matrices. In various embodiments, the foregoing steps of performed by a DSP such as a coherent DSP, a symbol rate DSP, and/or other DSP embodiments.

Figure 3:
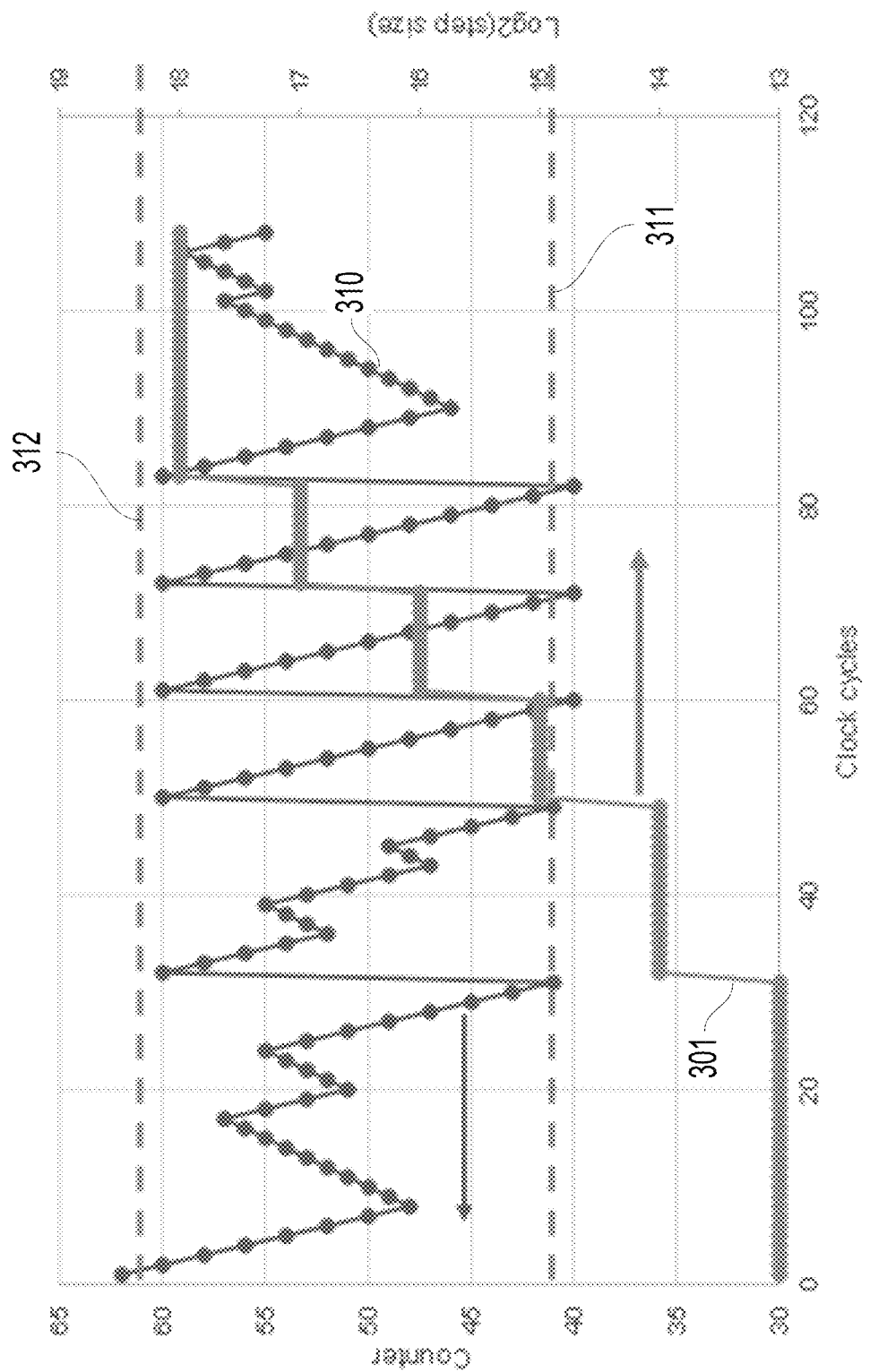
FIG. 3 is a plot of equalizer step size as it increases over a successive clock cycles after an equalizer performance monitor counter reaches a threshold according to an exemplary embodiment of the disclosure.

Refer now to the exemplary embodiment of FIG. 3, illustrating a change in a counter value 310—a number of applications of a trial Jones matrix—over clock cycles when fast changes in signal SOP occur. The counter value decreases until it is below a low threshold 311 to trigger an increase of step size 301 of the adaptive equalizer from $2^{13}$ to $2^{14}$. Afterward, the counter value is reset to a high value. If SOP changes so quickly that the equalizer is still not able to track the received signal, the counter value decreases below the low threshold again and the step size increases to $2^{15}$. This process may continue until the step size is $2^{18}$. Alternatively the step size 301 may be decreased if the counter 310 exceeds a high threshold 312. In some embodiments, the low threshold ranges from about 30 to about 50. In some embodiments, the high threshold ranges from about 55 to about 75.

Besides determining if the adaptive equalizer can track the fast SOP change, in various embodiments, it is desirable to measure the residual inter symbol interference (ISI) and signal to noise ratio (SNR) of equalizer output even in steady state. SNR can be easily measured directly. In contrast, direct measurement of ISI is not easy. As a result, in part, the disclosure relates to using spectral correlation as a measure of ISI.

In many embodiments, a transmitted signal may be a linearly modulated digital signal. A linearly modulated signal has a periodically time-varying linear filtering, $$x_a(t) = \sum_{m=-\infty}^{\infty} a_m p(t - mT_s)$$

where $a_m$ are the transmitted symbols, p(t) is a pulse shaping function at equalizer output, and $T_s$ is the symbol period. In various embodiments, the linearly modulated digital signal is a cyclostationary process. A linearly modulated signal possesses two properties relevant to the current disclosure: (1) such a signal generates a spectral line (SL) with quadratic time-invariant transformation, and (2) the Fourier transform of such a signal exhibits a correlation between frequency components spaced by symbol rate B=$1/T_s$, $$\left\langle X(f) X^*\left(f - \frac{1}{T_s}\right) \right\rangle = \frac{\langle |a_m|^2 \rangle}{T_s} P(f) P^*\left(f + \frac{1}{T_s}\right),$$

where $X(f)$ is the Fourier transform of the transmitted signal x(t) and $P(f)$ is the Fourier transform of the pulse-shaping function p(t). In the following, we established that this property holds for digital sampled signals.

In many embodiments, if a digital equalizer in a receiver recovers the transmitted signal at two samples per symbol, i.e.

$$T = \frac{T_s}{2},$$

the N-length receiver output is generated by N/2 transmitted symbols $a_m$, m=0, 1, . . . , N/2–1 as $$x_n = x_a(nT) = \sum_{m=0}^{\frac{N}{2}-1} a_m p(nT - 2mT) = \sum_{m=0}^{\frac{N}{2}-1} a_m p_{n-2m}$$

where $p_n$=p(nT) is a digital sample of the pulse shaping function and T is the sampling period.

The N-point discrete Fourier transform (DFT) of $x_n$ is $$X_k = \sum_{n=0}^{N-1} x_n e^{-\frac{j2\pi kn}{N}} = \sum_{n=0}^{N-1} \sum_{m=0}^{\frac{N}{2}-1} a_m p_{n-m} e^{-\frac{j2\pi kn}{N}}$$

Figure 4:
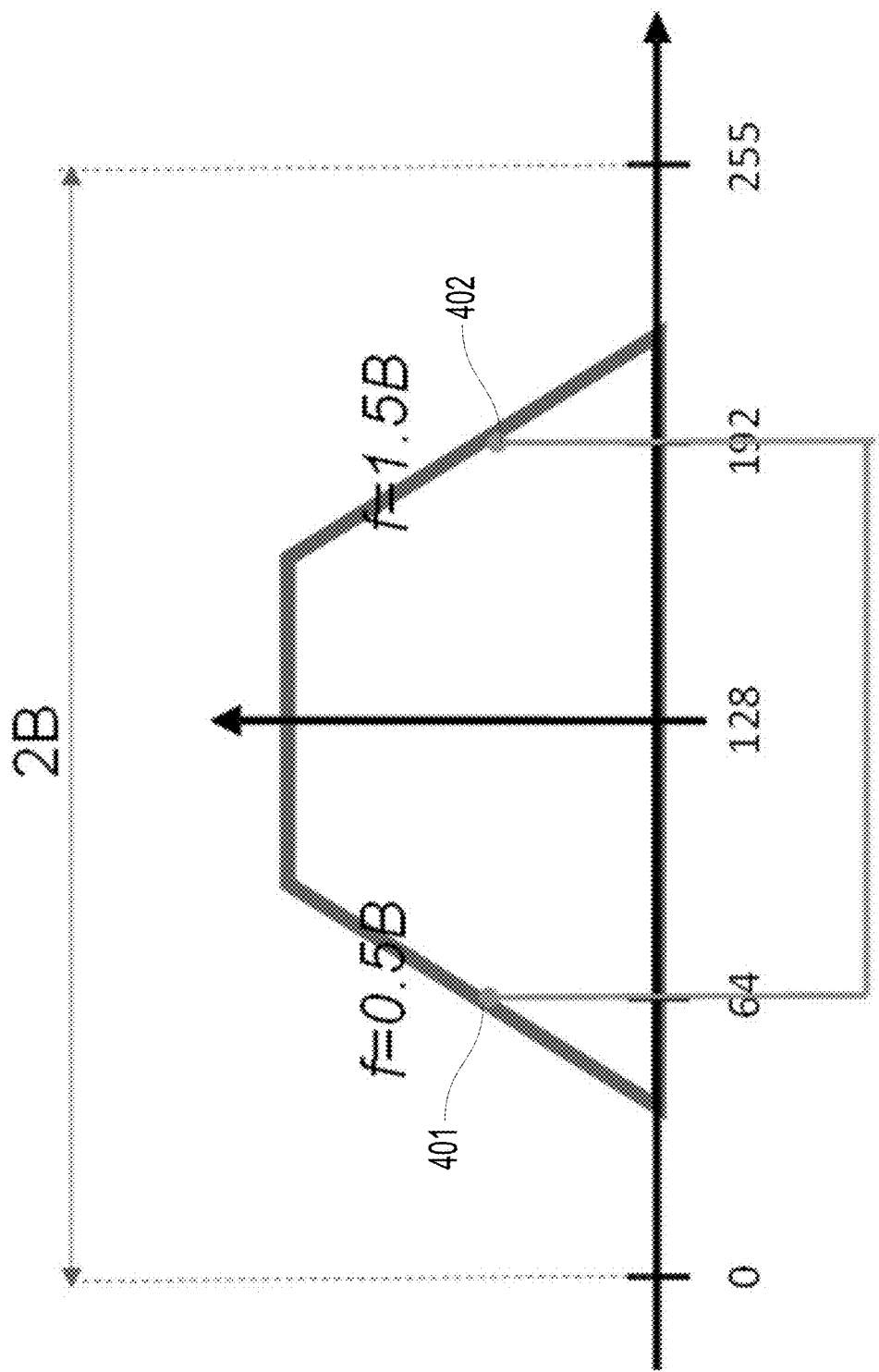
FIG. 4 is a 256-point DFT of a received signal according to an exemplary embodiment of the disclosure.

Refer now to the exemplary embodiment of FIG. 4, wherein a 256-point DFT of a received signal is illustrated. $X_{192}$ 402 and $X_{64}$ 401 are separated by N/2=128 and, as will be shown, are correlated.

Whereas the DFT of the digitized pulse shaping function is $$P_k = \sum_{n=0}^{N-1} p_n e^{-\frac{j2\pi kn}{N}},$$

then $$X_k = \sum_{m=0}^{\frac{N}{2}-1} a_m P_k e^{-\frac{j2\pi k(2m)}{N}},$$

and so spectral correlation is then $$X_k X_{k-N/2}^* = \sum_{m=0}^{\frac{N}{2}-1} a_m P_k e^{-\frac{j2\pi k(2m)}{N}} \sum_{m=0}^{\frac{N}{2}-1} a_n^* P_{k-\frac{N}{2}}^* e^{\frac{j2\pi (k-N/2)(2n)}{N}}.$$

As the data symbols are independent, $$\langle X_k X_{k-N/2}^* \rangle = \frac{\langle |a_m|^2 \rangle N}{2} P_k P_{k-N/2}^*$$

Figure 5:
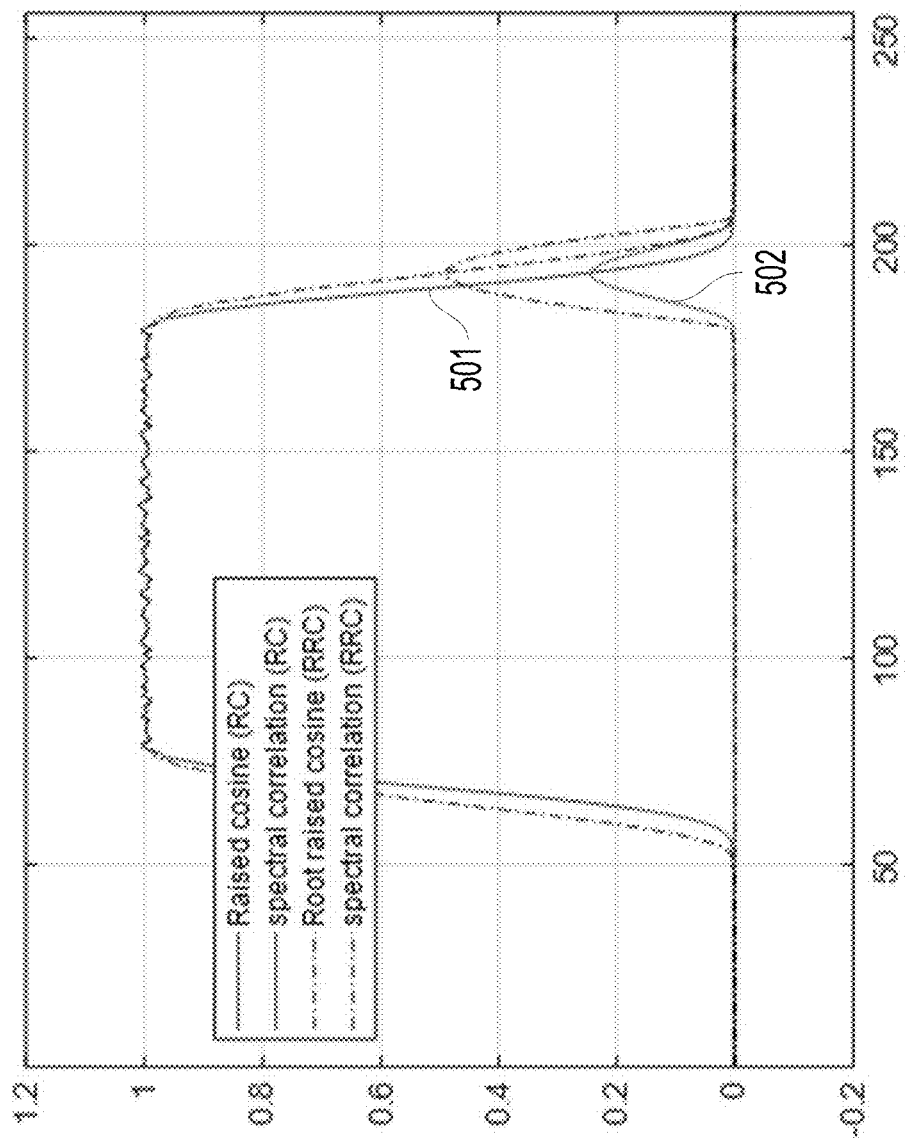
FIG. 5 is a plot of signal spectrum and spectral correlation for signals with raised cosine (RC) pulse shaping and root-raised cosine (RRC) pulse shaping according to an exemplary embodiment of the disclosure.

In many embodiments, the discrete Fourier transform (DFT) of a digital equalizer output has a spectral correlation between two frequency components spaced by N/2. In many embodiments, the effective pulse shaping function in the receiver may not be the same as the pulse shaping function in the transmitter. In many embodiments, a signal output from an equalizer has a raised cosine (RC) pulse shaping applied to avoid inter-symbol interference before symbol decision. Refer now to the exemplary embodiment of FIG. 5, wherein the spectral correlation 502 of an RC pulse shaping function 501 is about 0.25. Any difference from 0.25 indicates non-zero ISI. In many embodiments, since constant modulus algorithm (CMA) and least mean-squares (LMS)-based equalizers take both ISI and noise into account in the filter tap update, in various embodiments filter updates are selected that have a minimum mean-square error (MSE). Therefore, the real spectral correlation will be slightly lower than about 0.25.

Figure 6:
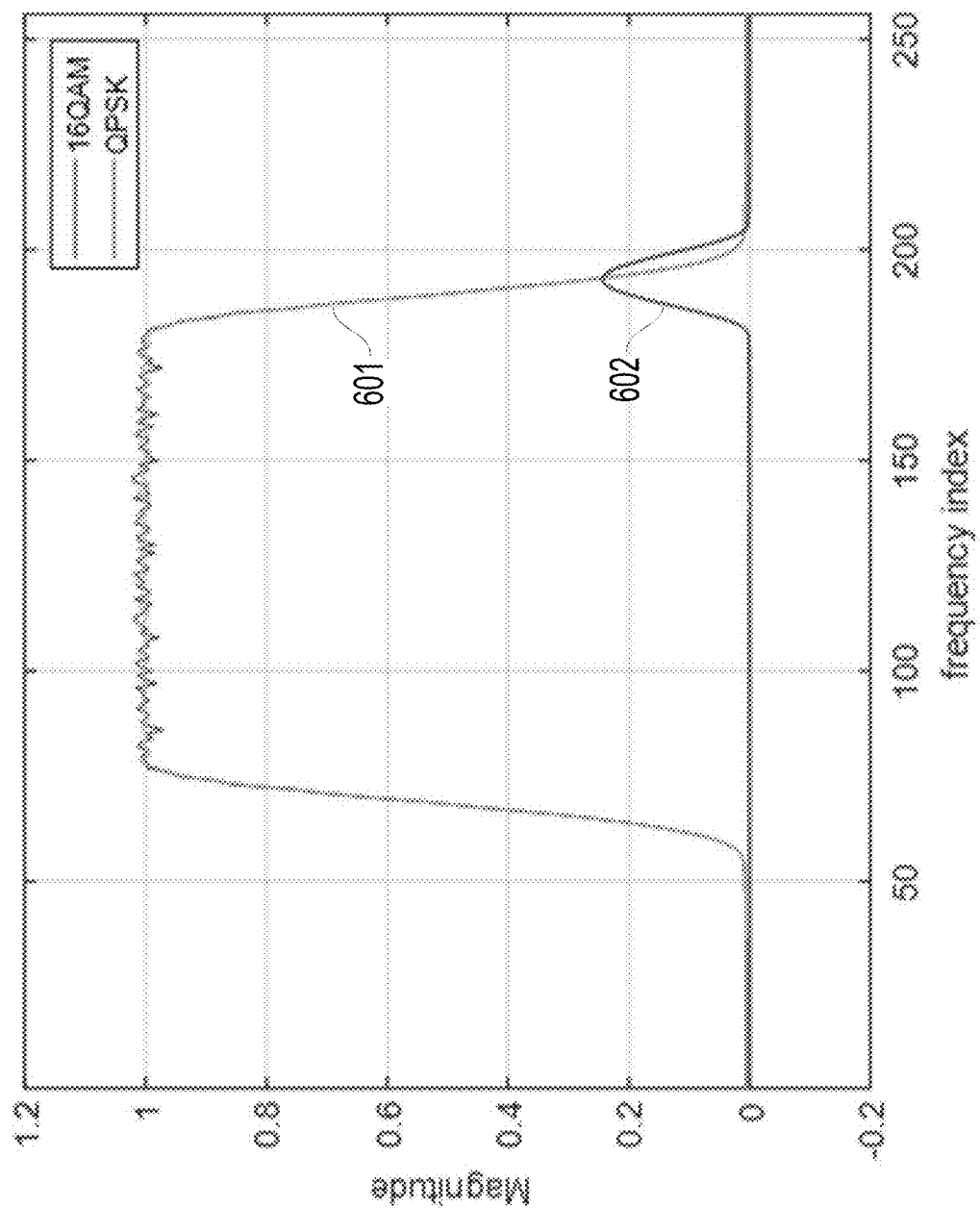
FIG. 6 is a plot of signal spectrum and spectral correlation for QPSK and 16QAM signals with raised cosine (RC) pulse shaping according to an exemplary embodiment of the disclosure.
Figure 7:
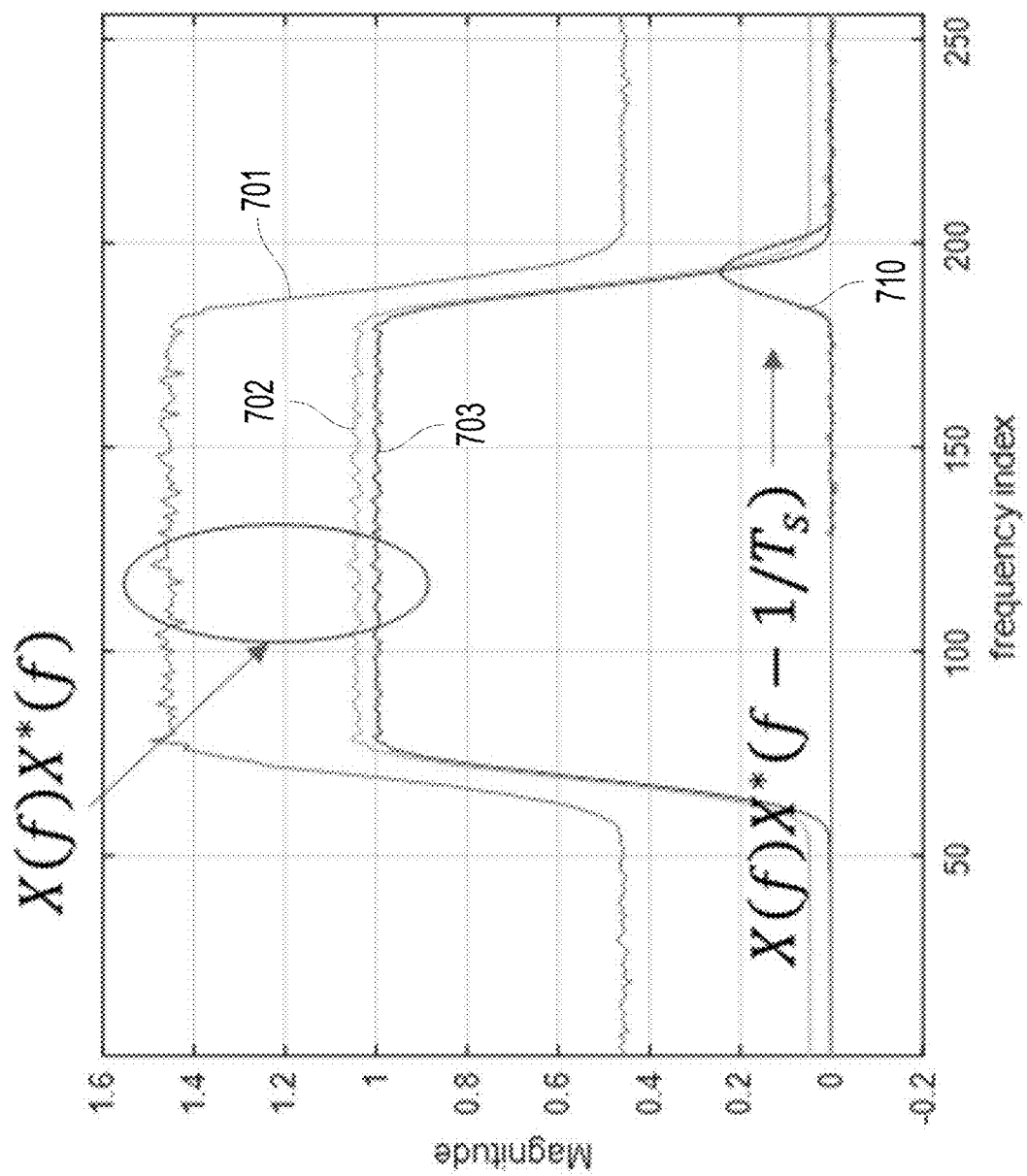
FIG. 7 is a plot of signal spectrum and spectral correlation for signals of different SNR according to an exemplary embodiment of the disclosure.

Refer now to the exemplary embodiment of FIGS. 6, wherein a signal spectrum 601 and a spectral correlation 602 for QPSK and 16QAM signals with raised cosine (RC) pulse shaping are illustrated; refer also to the exemplary embodiment of FIG. 7, wherein signal spectra 701-703 for signals with different SNR and spectral correlation 710 are illustrated. From FIG. 7, the plots show that the spectral correlation is insensitive to SNR and only depends on the pulse shaping function from the equalizer. Regardless of the modulation format and system SNR, if the signals achieve same pulse shaping function, then they provide the same spectral correlation. In many embodiments, the spectral correlation only depends on its pulse shaping function $P_k$ and average power which is a known constant, but insensitive to the modulation format and signal to noise ratio (SNR) as show in FIGS. 6 and 7. This property is important because the spectral correlation may be used as a universal metric to measure the pulse shaping function of the equalizer output. For example, spectral correlation provides a measure of the inter symbol interference at the equalizer output independent of the modulation format and SNR.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within rood, ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of equalizer performance monitoring, comprising:
   receiving a signal;
   adjusting step size of an adaptive equalizer in response to changes in state of polarization (SOP) of the received signal, wherein the adaptive equalizer is in communication with one or more digital signal processing (DSP) components, the adaptive equalizer comprising one or more filter coefficients;
   increasing or decreasing the step size of the adaptive equalizer in response to updates to the one or more filter coefficients;
   determining a spectral correlation of an output of the adaptive equalizer;
   monitoring changes to the spectral correlation over time;
   updating the one or more filter coefficients in response to the spectral correlation changes;
   selecting a first trial matrix M(1) and a second trial matrix M(2) and applying the matrices M(1) and M(2) to output of the adaptive equalizer, wherein the matrices M(1) and M(2) are each a trial Jones matrix, and wherein the matrices M(1) and M(2) each comprise a parameter $\alpha = \pm \alpha_0$; and
   synchronizing pilot symbols at the output of the adaptive equalizer, wherein the pilot symbols are represented by $$\begin{bmatrix} E_x \\ E_y \end{bmatrix}.$$

2. The method of claim 1 further comprising adaptively updating the one or more filter coefficients using a constant modulus algorithm (CMA) or a radius directed equalizer (RDE) algorithm.

3. The method of claim 1, wherein the step size determines tracking speed of the adaptive equalizer.

4. The method of claim 1 further comprising selecting one or more filter updates having a minimum mean-square error, wherein the one or more filter updates comprise changes to the one or more filter coefficients.

5. The method of claim 1, wherein the output of the adaptive equalizer is a Stokes vector, wherein the step size of the adaptive equalizer is adjusted such that the Stokes vector lies in a plane defined by two Stokes parameters.

6. The method of claim 1 further comprising iteratively applying the matrices M(1) and M(2) to the equalizer output until the equalizer output is in a plane.

7. The method of claim 6 wherein $$M(1) = \begin{bmatrix} 1 & -0.25 \\ 0.25 & 1 \end{bmatrix}$$

and $$M(2) = \begin{bmatrix} 1 & 0.25 \\ -0.25 & 1 \end{bmatrix}.$$

8. The method of claim 1 further comprising applying the matrices M(1) and M(2) to the pilot symbols as follows $$\begin{bmatrix} E_x(1) \\ E_y(1) \end{bmatrix} = M(1) \begin{bmatrix} E_x \\ E_y \end{bmatrix}$$

and $$\begin{bmatrix} E_x(2) \\ E_y(2) \end{bmatrix} = M(2) \begin{bmatrix} E_x \\ E_y \end{bmatrix}.$$

9. The method of claim 1 further comprising calculating an absolute value of a power difference D (i) between x and y polarization components after the application of the matrices M(1) and M(2), wherein i is an index, wherein $$D(0) = ||E_x|^2 - |E_y|^2|$$

$$D(1) = ||E_x(1)|^2 - |E_y(1)|^2|$$

$$D(2) = ||E_x(2)|^2 - |E_y(2)|^2|.$$

10. The method of claim 9, further comprising incrementing a counter value if D(0)<D(1) and D(0)<D(2), otherwise decrementing the counter value.

11. The method of claim 9, wherein, when a counter value is greater than an upper threshold, decrease the step size of the adaptive equalizer by half and reset the counter value to a reset value.

12. The method of claim 1 wherein $$M(1) = \begin{bmatrix} 1 & -0.125 \\ 0.125 & 1 \end{bmatrix}$$

and $$M(2) = \begin{bmatrix} 1 & 0.125 \\ -0.125 & 1 \end{bmatrix}.$$

13. The method of claim 1 wherein multiplication of one or more entries of the matrices M(1) and M(2), when applied to the output of the adaptive equalizer output is performed by shifting one or more bits of the $E_x$ and $E_y$.

14. A method of monitoring residual inter symbol interference, comprising:
   receiving a signal, wherein the signal is a linearly modulated digital signal;
   generating an equalizer output from an adaptive equalizer of the received signal, the adaptive equalizer comprising one or more filter coefficients;
   determining a spectral correlation of the equalizer output;
   monitoring changes to the spectral correlation over time, wherein monitoring the changes to the spectral correlation over time is independent of a signal-to-noise ratio (SNR) and a modulation format of the received signal; and
   updating the one or more filter coefficients in response to the spectral correlation changes, wherein the one or more filter coefficients for the adaptive equalizer are updated when the spectral correlation is greater than about 0.25.

15. A method of equalizer performance monitoring, comprising:
   adjusting a step size of an adaptive equalizer in response to changes in state of polarization (SOP) of a received signal;

increasing or decreasing the step size of the adaptive equalizer in response to updates to one or more filter coefficients;
determining a spectral correlation of an output of the adaptive equalizer;
monitoring changes to the spectral correlation over time, wherein monitoring the changes to the spectral correlation over time is independent of a signal-to-noise ratio (SNR) and a modulation format of the received signal; and
updating the one or more filter coefficients in response to the spectral correlation changes, wherein the one or more filter coefficients for the adaptive equalizer are updated when the spectral correlation is greater than about 0.25.

* * * * *